INVENTOR:
YASUJI SAKAI

United States Patent Office 3,324,911
Patented June 13, 1967

3,324,911
APPARATUS FOR BREAKING EGGS AUTOMATICALLY
Yasuji Sakai, Tokyo, Japan, assignor to Sakaiya Company, Ltd., Tokyo, Japan
Filed Dec. 10, 1964, Ser. No. 417,310
Claims priority, application Japan, Dec. 24, 1963, 38/69,199
4 Claims. (Cl. 146—2)

The invention relates to a new and useful apparatus for breaking eggs automatically, and more particularly to an automatic apparatus for breaking eggs and for separating the white from the yolk of broken eggs.

An object of the invention is to provide an apparatus of the above type which is simple and efficient and which is cheap to manufacture and easy to operate.

A further object is to provide an apparatus of the above type having a plurality of grippers in pairs, which have respectively a pair of egg holders with suckers or vacuum cups, passing along a nearly circular course for picking eggs up one by one from an egg conveying chute, means of breaking the egg picked up by falling down against a cutter, and a separating chute which has lengthwise slits on the bottom for separating the white from the yolk of the broken egg.

A further object is to provide an apparatus of the above type wherein breaking of eggs and separation of the whites of broken eggs from the yolks of the same are ensured.

A further object is to provide an apparatus of the above type wherein the contents and the shell fragments of broken eggs do not intermingle.

These and other objects will in part be obvious and will in part be hereinafter more fully disclosed.

In the drawings wherein similar reference characters refer to similar parts throughout the several views.

Figure 1:
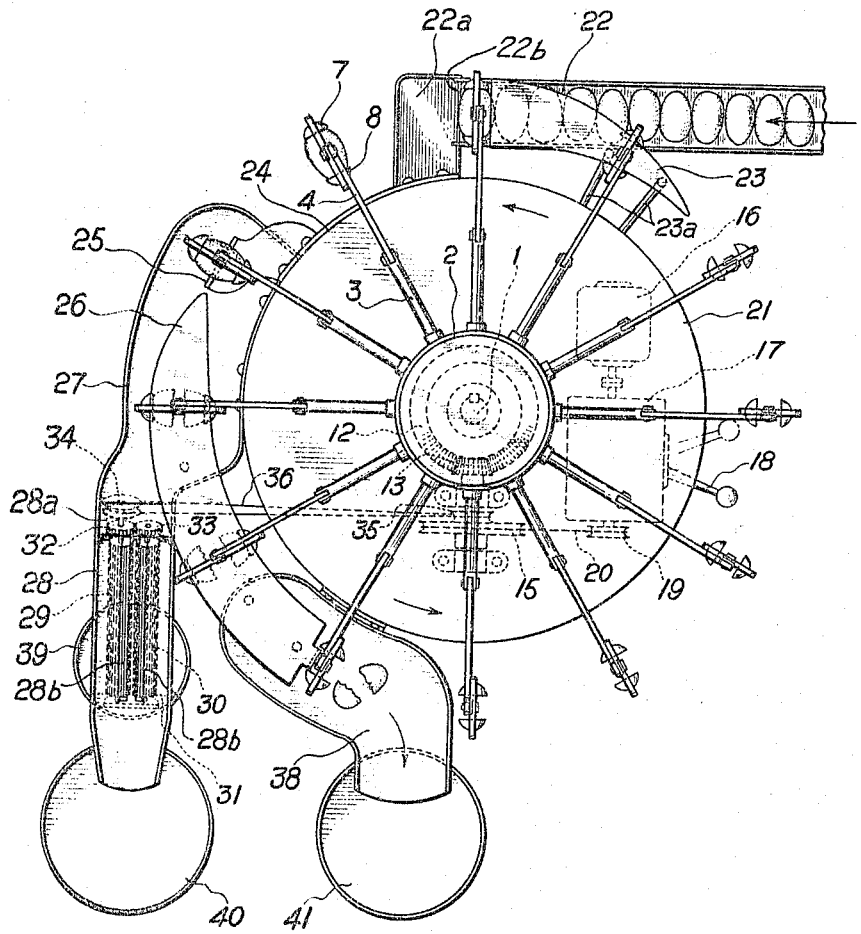
FIG. 1 is a plan view of the apparatus.
Figure 2:
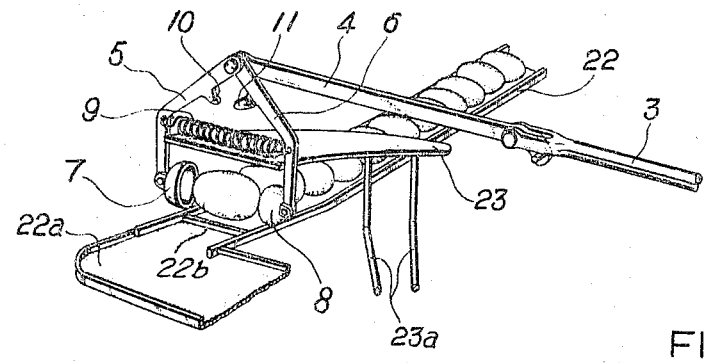
FIG. 2 is an enlarged perspective view of the mechanism for picking an egg up.
Figure 3:
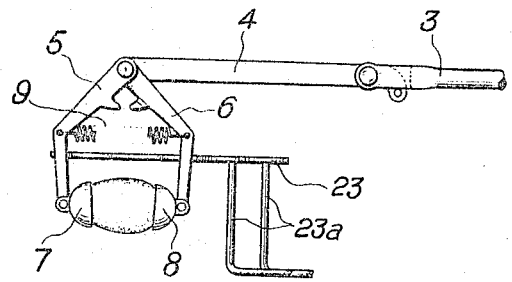
FIG. 3 is an enlarged view in front elevation of the same mechanism.
Figure 4:
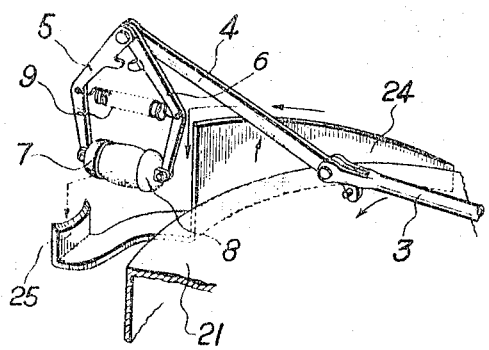
FIG. 4 is an enlarged perspective view of the mechanism for breaking an egg.
Figure 5:
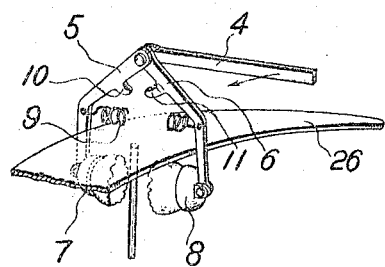
FIG. 5 is an enlarged perspective view in the middle of the second horizontal guide plate.
Figure 6:
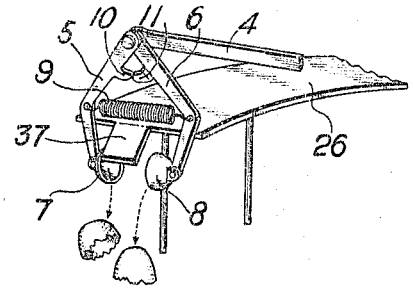
FIG. 6 is an enlarged perspective view in the widest end of the same.
Figure 7:
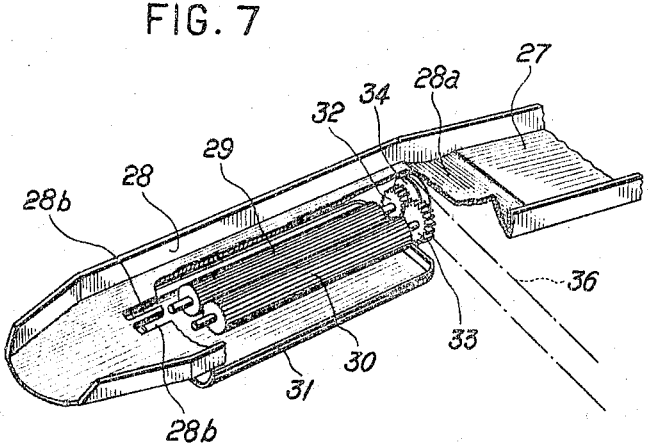
FIG. 7 is an enlarged perspective view of the mechanism for scraping the white of eggs off, with a portion thereof broken away for convenience of illustration.
Figure 8:
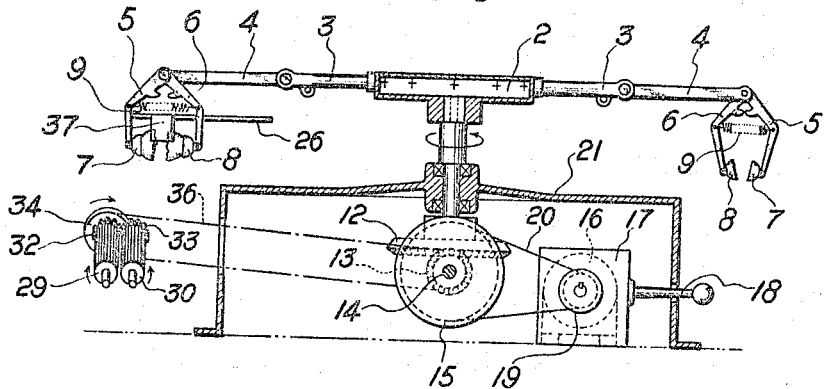
FIG. 8 is a diagrammatic view partly in front elevation and partly in section showing the driving gears of the apparatus.

Before explaining in detail the present invention it is to be understood that the invention is not limited in its application to the detail of construction and arrangement of parts illustrated in the accompanying drawings, since the invention is capable of other embodiments and of being practiced or carried out in various ways.

Referring now to the drawings, the apparatus embodying the invention includes a supporting base 21 having the shape of a cylinder closed at the top in the center of which is journaled an upright shaft 1 rotatably. To the upper end of the upright shaft 1 is fixed a hub 2 having a plurality of spokes 3 to each end of which a hanging rod 4 is pivoted respectively so as to swing upwards only by means of any desired detent. A pair of grippers 5 and 6 biased toward each other by a tension coiled spring 9, have on their lower ends a pair of opposing cup-shaped egg holders 7 and 8 of the sucker or vacuum type made of elastic gum material. The pair of grippers 5 and 6 are suspended from the outer ends of rods 4 respectively.

The larger bevel gear 12 fixed to the lower end of the upright shaft 1 meshes with the smaller bevel gear 13 on the intermediate horizontal shaft 14 which is provided with a belt wheel 15 driven by a belt 20 from an electric motor 16 through a reduction gear 17. Operatively connected to reduction gear 17 is a belt wheel 19 receiving belt 20 and adjustable by a lever 18. The electric motor 16, the reduction gear 17 and other driving mechanism are preferably covered by the supporting base 21.

Hence, when the electric motor 16 runs, the upright shaft 1 rotates at a moderate speed on its axis with the spokes 3 and the hanging rods 4, and the grippers 5 and 6 revolve around the supporting base 21, for instance in the left hand direction as shown by arrows in FIG. 1.

Surrounding the supporting base 21, the first horizontal guide plate 23, a vertical guide plate 24, a cutter 25 and a second horizontal guide plate 26 are located successively in the marching course of the grippers 5 and 6.

The first horizontal guide plate 23 connected with the side face of the supporting base 21 by the medium of arms 23a bends in a circular arc with gradually increasing width so as to be inserted between the grippers 5 and 6 for opening thereof.

Located tangentially of the course of grippers 5 and 6 is an egg conveying chute 22 having a stopper brim 22b for stopping eggs which run down along the sloping bottom of the chute 22. Brim 22b is located at the lowest end of the chute 22 in slightly advanced position below the widest end of the first horizontal guide plate 23. Chute 22 projects beyond brim 22b and has an extension forming a receptacle 22a for overrunning eggs with the lower part around the supporting base 21.

The vertical guide plate 24 fixed to the upper part around the supporting base 21 extends from the position facing the end of the egg conveying chute 22 and gradually increases in height so as to swing the hanging rod 4 upwards and raise the grippers 5 and 6.

A cutter 25 which consists of a vertical blade having an upward knife edge is located in the course of the grippers 5 and 6 when the latter are in the lower position. Cutter 25 is located laterally outwardly of base 21 at the highest end of the vertical guide plate 24.

The grippers 5 and 6 revolving around the supporting base 21 are guided and opened gradually in opposition to the action of the coiled spring 9 by the first horizontal guide plate 23. Upon release of grippers 5 and 6 by spring 9 as the grippers pass beyond guide plate 23, grippers 5 and 6 will move toward each other to a closed position whereupon holders 7 and 8 will engage the opposite ends of an egg resting on the lower end of chute 22.

Subsequently rod 4 is raised and guided upwardly by guide plate 24 until rod 4 passes the forward end of guide plate 24 at which time rod 4 will descend by gravity to engage the held egg with the cutter 25 to break the shell of the egg. The contents of the egg drop down from the broken egg shell into an egg contents receptacle 27 which extends under the cutter 25 along the course of the grippers 5 and 6. Receptacle 27 has a transverse groove or depression 28a, which holds temporarily, the contents of the egg for inspection and removal if they are bad. Beyond groove 28a is a separating chute 28 which has lengthwise slits 28b for separating the white from the yolk of the egg. Under slits 28b is a set of rollers 29 and 30 having longitudinal stripping grooves around their cylindrical surfaces very close under the slits 28b for scraping off the white of eggs.

The shaft of the rollers 29 and 30 above-mentioned may be journaled on the bearings (not shown) projecting downwards from the back of the bottom of the separating chute 28 and rotated inwardly in the opposite direction by meshing of a gear 33 on the shaft of the roller 30 with a gear 34 on the shaft of the roller 29. The shaft of roller 29 is driven by a belt 36 running over a belt wheel 34 on the latter shaft and another belt wheel (not shown) on the intermediate horizontal shaft 14.

Thus the white of the egg contents entering into the separating chute 28 drop through the slits 28b, and are scraped off into a white chute 31 which is located under rollers 29 and 30. The white of the egg is discharged from the white chute 31 into a white reservoir 39, while the yolk of the egg contents separated from the white runs down on the separating chute 28 and is discharged into a yolk reservoir 40.

After passing over the egg cutter 25, the grippers 5 and 6 holding shell fragments of the broken egg by the holders 7 and 8 being closed, continue to revolve around the supporting base 21, and are guided and opened again by a second horizontal guide plate 26 which follows the cutter 25 and extends above the egg contents receptacle 27 along the course of the grippers 5 and 6, bending in a circular arc and increasing in width gradually so as to be inserted between the grippers 5 and 6 for opening thereof. Upon being released from the forward end of the second horizontal guide plate 26, grippers 5 and 6 close suddenly by action of the coiled spring 9. Accordingly the fragments of the broken shell fall from the egg holders 7 and 8 into a shell chute 38 located under the widest end of the second horizontal guide plate 26 by the shock of closing and or the impact against a small forward projection 37 from the middle of the widest end of the second horizontal guide plate 26. The shells are discharged from the receptacle 38 into a shell reservoir 41.

What I claim is:

1. In apparatus for breaking eggs automatically, the combination including; a rotatable upright shaft, a plurality of rods projecting radially from the shaft and connected to the shaft for rotation therewith, a number of pairs of grippers including egg holders having oppositely positioned suction means, said pairs of grippers being suspended respectively from said rods downwardly and having spring means urging the grippers towards each other to a closed position for holding an egg, a first arched horizontal guide plate gradually increasing in width located in the course of said grippers for engagement between said grippers to open said grippers for receiving an egg in the egg holders for said grippers, an egg conveying chute for conveying eggs to be engaged by said egg holders of said grippers, a vertical guide plate gradually increasing in height engageable with the rods for raising the rods and consequently the grippers and egg holders, a cutter having an upwardly facing knife edge located in the course of said grippers as the grippers leave said vertical guide plate and fall downwardly under gravity, said knife edge being located laterally outwardly of the vertical guide plate at the highest end thereof and adapted to engage and break the shell of an egg held by the descending holders of the grippers, an egg contents receptacle extending under said cutter along the course of said grippers, a separating chute having lengthwise slits for separating the white from the yolk of the egg, said separating chute being connected with said egg contents receptacle to receive the egg contents from the egg contents receptacle, a second arched horizontal guide plate gradually increasing in width and extending above said egg contents receptacle along the course of said grippers in advance of said first horizontal guide plate, said second arched horizontal guide plate receiving said grippers and being engageable therewith for opening said grippers again for releasing the shell of the egg, and a shell chute located under the widest end of said second horizontal guide plate for receiving the shell of the eggs.

2. In apparatus for breaking eggs automatically, the combination including; a rotatable upright shaft, a plurality of rods projecting radially from the shaft and connected to the shaft for rotation therewith, a number of pairs of grippers including egg holders having oppositely positioned suction means, said pairs of grippers being suspended respectively from said rods downwardly and having spring means urging the grippers towards each other to a closed position for holding an egg, a first arched horizontal guide plate gradually increasing in width located in the course of said grippers for engagement between said grippers to open said grippers for receiving an egg in the egg holders of said grippers, an egg conveying chute for conveying eggs to be engaged by said egg holders of said grippers, a vertical guide plate gradually increasing in height engageable with the rods for raising the rods and consequently the grippers and egg holders, a cutter having an upwardly facing knife edge located in the course of said grippers as the grippers leave said vertical guide plate and fall downwardly under gravity, said knife edge being located laterally outwardly of the vertical guide plate at the highest end thereof and adapted to engage and break the shell of an egg held by the descending egg holders of the grippers, an egg contents receptacle extending under said cutter along the course of said grippers, a separating chute having lengthwise slits for separating the white from the yolk of the egg, said separating chute being connected with said egg contents receptacle to receive the egg contents from the egg contents receptacle, a second arched horizontal guide plate gradually increasing in width and extending above said egg contents receptacle along the course of said grippers in advance of said first horizontal guide plate, said second arched horizontal guide plate receiving said grippers and being engageable therewith for opening said grippers again for releasing the shell of the egg, and a shell chute located under the widest end of said second horizontal guide plate for receiving the shell of the eggs, and a set of rollers located closely under said slits in the separating chute and rotatable in counter directions inwardly towards each other and downwardly for stripping off the white of the egg from the remainder of the egg contents.

3. In apparatus for breaking eggs automatically, the combination including; a rotatable upright shaft, a plurality of rods projecting radially from the shaft and connected to the shaft for rotation therewith, a number of pairs of grippers including egg holders having oppositely positioned suction means, said pairs of grippers being suspended respectively from said rods downwardly and having spring means urging the grippers towards each other to a closed position for holding an egg, a first arched horizontal guide plate gradually increasing in width located in the course of said grippers for engagement between said grippers to open said grippers for receiving an egg in the egg holders of said grippers, an egg conveying chute for conveying eggs to be engaged by said egg holders of said grippers, a vertical guide plate gradually increasing in height engageable with the rods for raising the rods and consequently the grippers and egg holders, a cutter having an upwardly facing knife edge located in the course of said grippers as the grippers leave said vertical guide plate and fall downwardly under gravity, said knife edge being located laterally outwardly of the vertical guide plate at the highest end thereof and adapted to engage and break the shell of an egg held by the descending holders of the grippers, an egg contents receptable extending under said cutter along the course of said grippers, a separating chute having lengthwise slits for separating the white from the yolk of the egg, said separating chute being connected with said egg contents receptacle to receive the egg contents from the egg contents receptacle, a second arched horizontal guide plate gradually increasing in width and extending above said egg contents receptacle along the course of said grippers in advance of said first horizontal guide plate, said second arched horizontal guide plate receiving said grippers and being engageable therewith for opening said grippers again for releasing the shell of the egg, and a shell chute located under the widest end of said second horizontal guide plate for receiving the shell of the eggs, and a set of rollers located closely under said slits in the separating chute and rotatable in counter directions inwardly towards each other and downwardly for stripping off the white of the egg from tthe remainder of tthe egg contents, said rollers having longitudinal stripping grooves on their peripheral surfaces for aiding in the stripping of the egg whites.

4. In apparatus for breaking eggs automatically, the combination including; a rotatable upright shaft, a plurality of rods projecting radially from the shaft and connected to the shaft for rotation therewith, a number of pairs of grippers including egg holders having oppositely directed suction means, said pairs of grippers being suspended respectively from said rods downwardly and having spring means urging the grippers towards each other to a closed position for holding an egg, a first arched horizontal guide plate gradually increasing in width located in the course of said grippers for engagement between said grippers to open said grippers for receiving an egg in the egg holders of said grippers, an egg conveying chute for conveying eggs to be engaged by said egg holders of said grippers, a vertical guide plate gradually increasing in height engageable with the rods for raising the rods and consequently the grippers and egg holders, a cutter having an upwardly facing knife edge located in the course of said grippers as the grippers leave said vertical guide plate and fall downwardly under gravity, said knife edge being located laterally outwardly of the vertical guide plate at the highest end thereof and adapted to engage and break the shell of an egg held by the descending egg holders of the grippers, an egg contents receptacle extending under said cutter along the course of said grippers, a separating chute having lengthwise slits for separating the white from the yolk of the egg, said separating chute being connected with said egg contents receptacle to receive the egg contents from the egg contents receptacle, a second arched horizontal guide plate gradually increasing in width and extending above said egg contents receptacle along the course of said grippers in advance of said first horizontal guide plate, said second arched horizontal guide plate receiving said grippers and being engageable therewith for opening said grippers again for releasing the shell of the egg, and a shell chute located under the widest end of said second horizontal guide plate for receiving the shell of the eggs, and a set of rollers located closely under said slits in the separating chute and rotatable in counter directions inwardly towards each other and downwardly for stripping off the white of the egg from the remainder of the egg contents, said rollers having longitudinal stripping grooves on the peripheral surfaces for aiding in the stripping of the egg white, and chute means including a groove extending transversely of the course of the grippers, said chute means interconnecting said contents receptacle and separating chute with said groove serving to temporarily hold the contents of the egg for inspection and removal if defective.

References Cited
UNITED STATES PATENTS

| | | | |
|---|---|---|---|
| 1,646,682 | 10/1927 | Christian et al. | 146—2 |
| 2,090,963 | 8/1937 | Reese | 146—2 |
| 3,137,330 | 6/1964 | MacLagan | 146—2 |

WILLIAM W. DYER, Jr., *Primary Examiner.*

W. GRAYDON ABERCROMBIE, *Examiner.*